United States Patent
Kim et al.

(10) Patent No.: US 9,525,521 B2
(45) Date of Patent: Dec. 20, 2016

(54) METHOD AND APPARATUS FOR SCHEDULING COMP USER EQUIPMENT

(75) Inventors: Younsun Kim, Seongnam-si (KR); Kiil Kim, Yongin-si (KR); Cheng Shan, Suwon-si (KR); Hyojin Lee, Seoul (KR); Joonyoung Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 314 days.

(21) Appl. No.: 13/534,628

(22) Filed: Jun. 27, 2012

(65) Prior Publication Data
US 2012/0327873 A1    Dec. 27, 2012

(30) Foreign Application Priority Data

Jun. 27, 2011    (KR) ........................ 10-2011-0062180

(51) Int. Cl.
| H04L 5/00 | (2006.01) |
| H04W 72/12 | (2009.01) |
| H04L 25/03 | (2006.01) |

(52) U.S. Cl.
CPC ............. *H04L 5/0007* (2013.01); *H04L 5/005* (2013.01); *H04L 5/0035* (2013.01); *H04L 5/0073* (2013.01); *H04L 5/0091* (2013.01); *H04W 72/1289* (2013.01); *H04L 25/03866* (2013.01)

(58) Field of Classification Search
USPC ........................................................ 370/329
See application file for complete search history.

(56) References Cited

U.S. PATENT DOCUMENTS

| 2010/0144334 A1* | 6/2010 | Gorokhov ............. H04L 5/0035 455/418 |
| 2010/0285810 A1 | 11/2010 | Ko et al. |
| 2010/0291936 A1* | 11/2010 | Zangi .................... H04B 7/024 455/450 |
| 2011/0038310 A1* | 2/2011 | Chmiel et al. ................. 370/328 |
| 2011/0038330 A1* | 2/2011 | Luo et al. ..................... 370/329 |
| 2011/0070918 A1* | 3/2011 | Hafeez ................. H04B 7/0452 455/522 |
| 2011/0149877 A1* | 6/2011 | Hafeez .................. H04B 7/024 370/329 |
| 2011/0268007 A1* | 11/2011 | Barany et al. ................. 370/312 |
| 2012/0087273 A1* | 4/2012 | Koo ...................... H04W 16/02 370/252 |
| 2012/0188950 A1* | 7/2012 | Luo et al. ..................... 370/329 |
| 2013/0156001 A1* | 6/2013 | Gomadam ..................... 370/330 |
| 2013/0230013 A1* | 9/2013 | Seo et al. ...................... 370/329 |
| 2013/0294279 A1* | 11/2013 | Nagata et al. ................. 370/252 |
| 2014/0016596 A1* | 1/2014 | Kim et al. .................... 370/329 |
| 2014/0044061 A1* | 2/2014 | Yue ..................... H04W 72/042 370/329 |

(Continued)

FOREIGN PATENT DOCUMENTS

| WO | WO 2011/020062 | 2/2011 |
| WO | WO 2011/055940 | 5/2011 |

*Primary Examiner* — Deepa Belur
(74) *Attorney, Agent, or Firm* — The Farrell Law Firm, P.C.

(57) ABSTRACT

Methods and apparatus are provided for scheduling in a communication system. A Coordinated Multi-point Transmission/Reception (CoMP) set of cells is determined for a terminal that supports a CoMP function. An indicator for use in scheduling one or more cells in the CoMP set and cell information corresponding to the indicator are transmitted to the terminal. Scheduling information with the indicator is transmitted to the terminal.

9 Claims, 9 Drawing Sheets

(56) References Cited

U.S. PATENT DOCUMENTS

| | | | |
|---|---|---|---|
| 2014/0146756 A1* | 5/2014 | Sahin | H04L 1/0025 370/329 |
| 2015/0208265 A1* | 7/2015 | Dalsgaard | H04B 17/382 370/252 |
| 2015/0341132 A1* | 11/2015 | Hwang | H04J 11/00 370/329 |
| 2016/0036571 A1* | 2/2016 | Park | H04B 7/024 370/330 |

* cited by examiner

METHOD AND APPARATUS FOR SCHEDULING COMP USER EQUIPMENT

PRIORITY

This application claims priority under 35 U.S.C. 119(a) to an application filed in the Korean Intellectual Property Office on Jun. 27, 2011, and assigned Serial No. 10-2011-0062180, the content of which is incorporated herein by reference.

BACKGROUND OF THE INVENTION

1. Field of the Invention

The present invention relates generally to a method and apparatus for scheduling a Coordinated Multi-Point Transmission/Reception-enabled User Equipment (CoMP-enabled UE), and more particularly, to a resource allocation method and apparatus for facilitating efficient time and frequency resource management in a system supporting CoMP.

2. Description of the Related Art

Mobile communication systems have evolved into high-speed, high-quality wireless packet data communication systems that provide data and multimedia services beyond the early voice-oriented services. Recently, various mobile communication standards, such as, for example, High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined in Institute of Electrical and Electronics Engineers (IEEE), have been developed to support high-speed, high-quality wireless packet data communication services. Particularly, LTE is capable of facilitating high speed packet data transmission and maximizing throughput of a radio communication system with various radio access technologies. LTE-A is an evolved version of LTE that improves data transmission capability.

The existing $3^{rd}$ Generation (3G) wireless packet data communication system, such as, for example, HSDPA, HSUPA or HRPD, uses technologies such as Adaptive Modulation and Coding (AMC) and Channel-Sensitive Scheduling (CSS) to improve transmission efficiency. A transmitter can adjust a data transmission amount according to a channel state using AMC. Specifically, when the channel state is 'bad', the transmitter reduces the data transmission amount to match the reception error probability to a desired level, and when the channel state is 'good', the transmitter increases the data transmission amount to transmit a larger volume of information efficiently while matching the reception error probability to the desired level. Since the transmitter selectively services a user having a superior channel state among several users, the transmitter can increase the system capacity using the CSS resource management method, as compared with a transmitter that allocates a channel to one user and services the user with the allocated channel. Such a capacity increase is commonly referred to as a multi-user diversity gain. The AMC method and the CSS method receive partial channel state information that is fed back from a receiver, and apply an appropriate modulation and coding technique at the most efficient time determined depending on the received partial channel state information.

When using AMC along with a Multiple Input Multiple Output (MIMO) transmission scheme, it may be necessary to consider a number of spatial layers and ranks for transmitting signals. In this case, the transmitter determines the optimal data rate in consideration of the number of layers for use in MIMO transmission.

Recently, research has been conducted to replace Code Division Multiple Access (CDMA) used in legacy $2^{nd}$ and $3^{rd}$ mobile communication systems with Orthogonal Frequency Division Multiple Access (OFDMA) for a next generation mobile communication system. The 3GPP and 3GPP2 are currently standardizing an OFDMA-based evolved system. OFDMA is expected to provide superior system throughput as compared to CDMA. One of the main factors that allows OFDMA to increase system throughput is the frequency domain scheduling capability. As CSS increases the system capacity using the time-varying channel characteristic, OFDM can be used to obtain more capacity gain using the frequency-varying channel characteristic.

Also, research has focused on a Coordinated Multi-Point Transmission/Reception (CoMP) technique which enables a UE to receive signals from multiple base stations, such as, for example, enhanced Node Bs (eNBs).

SUMMARY OF THE INVENTION

The present invention has been made to address at least the above problems and/or disadvantages and to provide at least the advantages described below. Accordingly, an aspect of the present invention provides a method and apparatus for efficiently scheduling a Physical Downlink Shared CHannel (PDSCH) in a CoMP-enabled LTE-A system.

In accordance with an aspect of the present invention, a scheduling method of a communication system is provided. A CoMP set of cells is determined for a terminal that supports a CoMP function. An indicator for use in scheduling one or more cells in the CoMP set and cell information corresponding to the indicator are transmitted to the terminal. Scheduling information with the indicator is transmitted to the terminal.

In accordance with another aspect of the present invention, a method for scheduling a terminal supporting a CoMP function is provided. An indicator for use in scheduling one or more cells in a CoMP set of cells for the terminal and cell information corresponding to the indicator, are received at the terminal. Scheduling information including the indicator is received at the terminal. Data is received at the terminal using the cell information corresponding to the indicator.

In accordance with another aspect of the present invention, a base station of a communication system is provided. The base station includes a controller that determines a CoMP set of cells for a terminal that supports a CoMP function. The base station also includes a communication unit that transmits, to the terminal, an indicator for use in scheduling one or more cells in the CoMP set and cell information corresponding to the indicator, and transmits, to the terminal, scheduling information with the indicator.

In accordance with still another aspect of the present invention, a terminal supporting a CoMP function is provided. The terminal includes a communication unit that receives an indicator for use in scheduling one or more cells in a CoMP set of cells for the terminal and cell information corresponding to the indicator, scheduling information including the indicator, and data using the cell information corresponding to the indicator.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
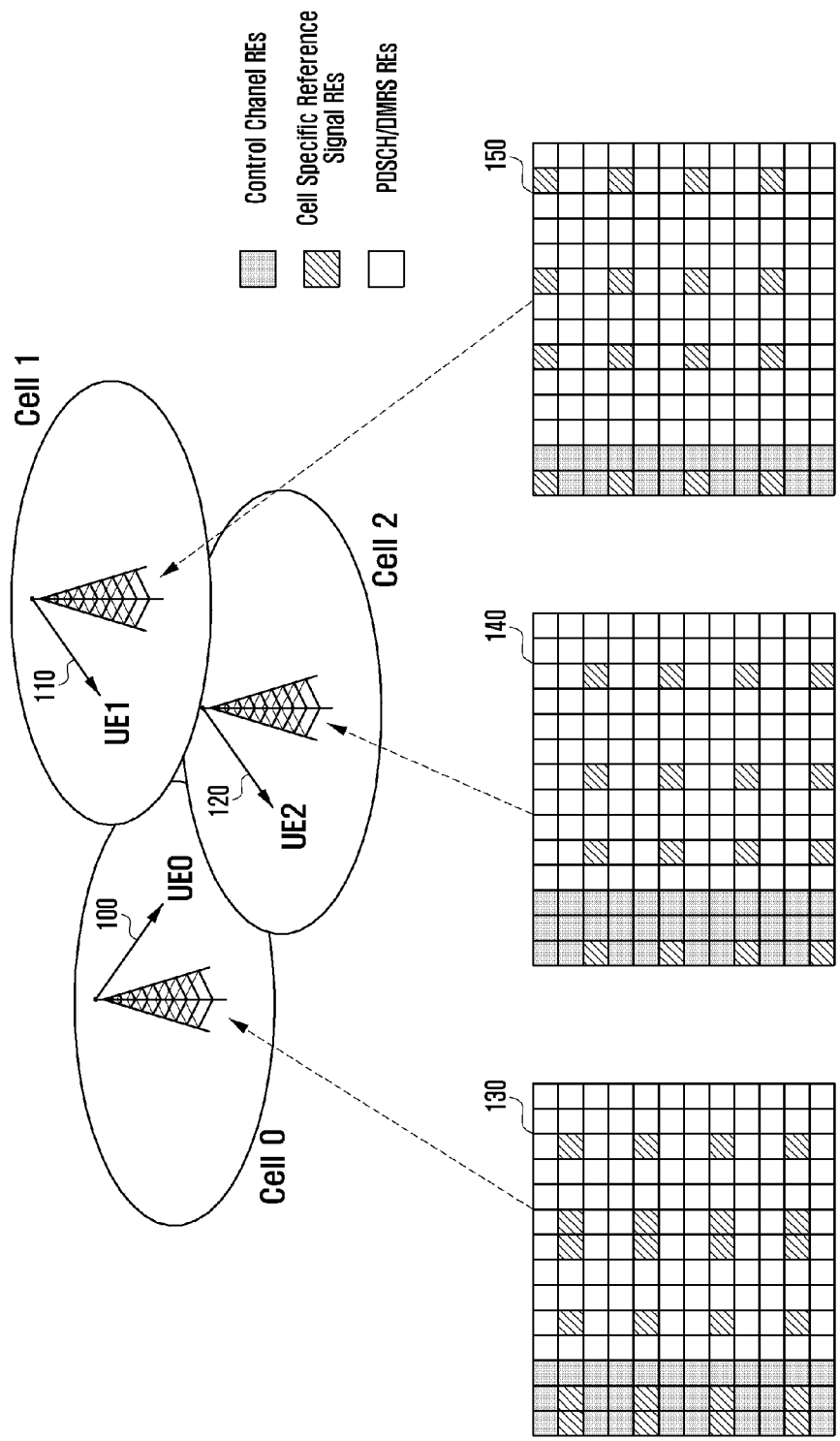
FIG. 1 is a diagram illustrating a configuration of a cellular system.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Although a detailed description of embodiments of the present invention is given herein with reference to an OFDM-based radio communication system, particularly a 3GPP E-UTRA standard system, it will be understood by those skilled in the art that the embodiments of the present invention can be applied to other communication systems having a similar technical background and channel format, with a slight modification, without departing from the spirit and scope of the present invention.

FIG. 1 is a diagram illustrating a configuration of a cellular system. FIG. 1 is directed to a cellular system composed of a plurality of cells for providing mobile communications using the aforementioned techniques.

Figure 2:
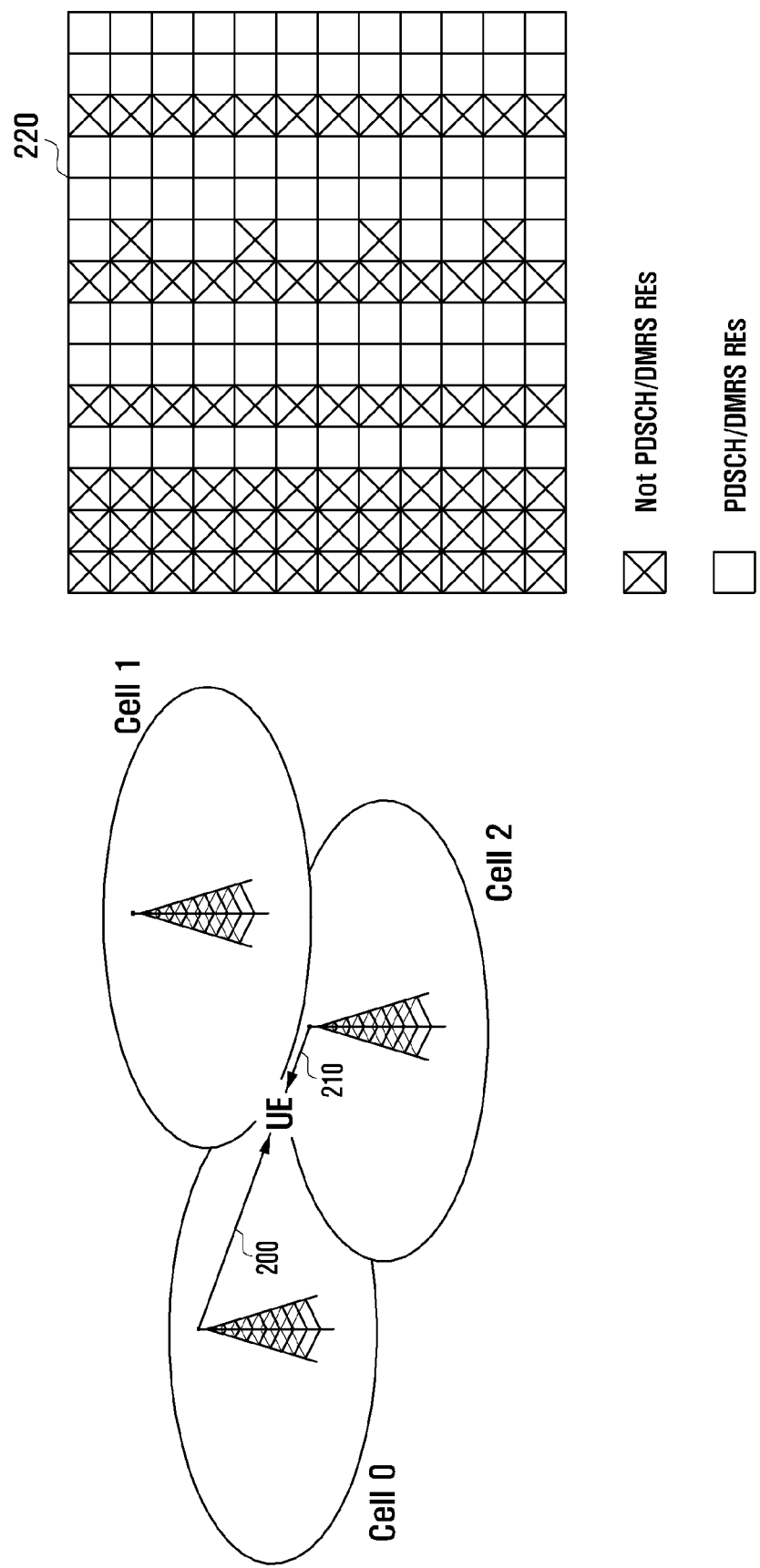
FIGS. 2 to 5 are diagrams illustrating configurations of the cellular system operating in CoMP modes, according to embodiments of the present invention.

Referring to FIG. 1, the mobile communication system includes three cells (cell 0, cell 1, and cell 2). Each cell is implemented with a transmit/receive antenna located at its center. Cell 0, cell 1, and cell 2 of FIG. 1 are equipped with respective eNB transmission/reception facilities to support data communication with the UEs located within the corresponding cells. In FIG. 1, UE0 located within the service area of cell 0 receives a data signal 100 from an eNB of cell 0. The eNBs of cells 1 and 2 transmit data signals 110 and 120 to UE 1 and UE2, respectively, using the same time and frequency resources at the same time the eNB of cell 0 transmits the data signal to UE0. Such transmissions of cells 0, 1, and 2 are referred to non-CoMP transmissions. Specifically, each of cells 0, 1, and 2 uses the radio resource of a cell for UEs located within the corresponding cell. A lower part of FIG. 2 shows radio resource configurations 130, 150, and 140 of the respective cells (cells 0, 1, and 2) for signal transmissions.

In FIG. 1, each UE must know the frequency and time resources available for the signal transmitted by the eNB of the corresponding cell in advance. For example, the UE that receives the signal 100 in cell 0 may check the location of a Cell Specific Reference Signal (CRS) in the signal transmitted by the eNB of cell 0, and a number of OFDM symbols assigned for a control channel before receiving a PDSCH. In FIG. 1, the signals of the eNBs of cells 0, 1, and 3 are transmitted at different locations in the PDSCH region. When receiving a non-CoMP transmission, the UEs receive the signals from the fixed cells, respectively. This means that the UE located within cell 0 continues receiving the signal from the eNB of cell 0 as long as a handover based on a higher layer signal does not take place.

In the LTE/LTE-A system configured as shown in FIG. 1, the downlink transmission may be divided into a control region and a data region in a time domain. The control region is used for transmitting control channels such as a Physical Downlink Control Channel (PDCCH), a Physical Hybrid ARQ Indicator Channel (PHICH), and a Physical Control Format Indicator Channel (PCFICH), and occupies one, two, or three OFDM symbols at the beginning of a subframe. The data region starts from the OFDM symbol following the control region for transmitting PDSCH as the data channel. Since one subframe consists of a fixed number of OFDM symbols, the size of the data region is determined depending on the size of the control region. Typically, in the LTE/LTE-A system, the UE checks the size of the control region based on the control information carried in PCFICH, and then determines the size of the data region depending on the size of the control region.

FIG. 1 shows the configuration of the system operating in non-CoMP transmission mode in which the eNBs perform data transmission without cooperation among each other.

FIGS. 2 to 5 show configurations of the system operating in CoMP modes, according to embodiments of the present invention.

In FIG. 2, the UE receives the PDSCH from cells 0 and 2. Unlike the case of FIG. 1, the UE can receive the signal from two cells simultaneously in the embodiment of FIG. 2. When the signal is received from the two cells, the eNBs have to transmit the PDSCH in consideration of the CRS and the control channel. In the embodiment of FIG. 2, the UE receives the PDSCH at the region with the exception of the radio resources allocated for CRSs and control channels for the cells 0 and 2. A right-most portion of FIG. 2 shows radio resource configuration 220 for receiving PDSCH when receiving a signal transmitted by two eNBs. The radio resource configuration 220 may be derived from the radio resource configurations 130 and 140 of FIG. 1. Specifically, in order to receive the signal from multiple cells, the radio resource for PDSCH transmission to the UE may be configured differently depending on the arrangements of the control channels and CRSs of the respective cells.

In order for the UE to receive the PDSCH and decode the data on the PDSCH, the UE has to know the configuration of the radio resource used for PDSCH transmission. Without information on the frequency and time resources for PDSCH transmission, the UE cannot recover the data on the PDSCH successfully. Accordingly, the UE operating in CoMP mode must have the information on the radio resources available for the respective cells and the radio resource allocated for PDSCH transmission per cell.

In a conventional CoMP system, a higher layer device predetermines the cells that perform CoMP transmission, notifies the UE of the CoMP cells through higher layer signaling, and initiates CoMP transmission. Once it is determined to participate in the CoMP transmission, the CoMP cells cooperate in the CoMP mode until the cells participating in the CoMP transmission are changed by the next higher layer signaling. The higher layer signaling-based CoMP cell determination and notification is capable of notifying the UE of the CoMP cells such that the UE can check the resource used for PDSCH transmission. However, this method has the following drawbacks. When using higher layer signaling to notify of the CoMP cells, it is difficult to configure the CoMP cells in adaptation to the traffic and radio channel condition in CoMP transmission.

In the CoMP-enabled system, the optimal combination of the cells participating in downlink transmission may change instantly according to the traffic and radio channel conditions. For a mobile communication system such as an LTE-A system, which schedules UEs by 1 millisecond, the CoMP cells may change by 1 millisecond.

Typically, the network operating in CoMP mode selects a CoMP set per UE. The CoMP set can be configured differently according to the location of the UE. The CoMP set is the set of the cells that can transmit signals to the UE. In FIG. 2, the UE is configured with a CoMP set {cell 0, cell 1, cell 2} and receives signal from cell 0 and cell 2, and not cell 1.

Figure 3:
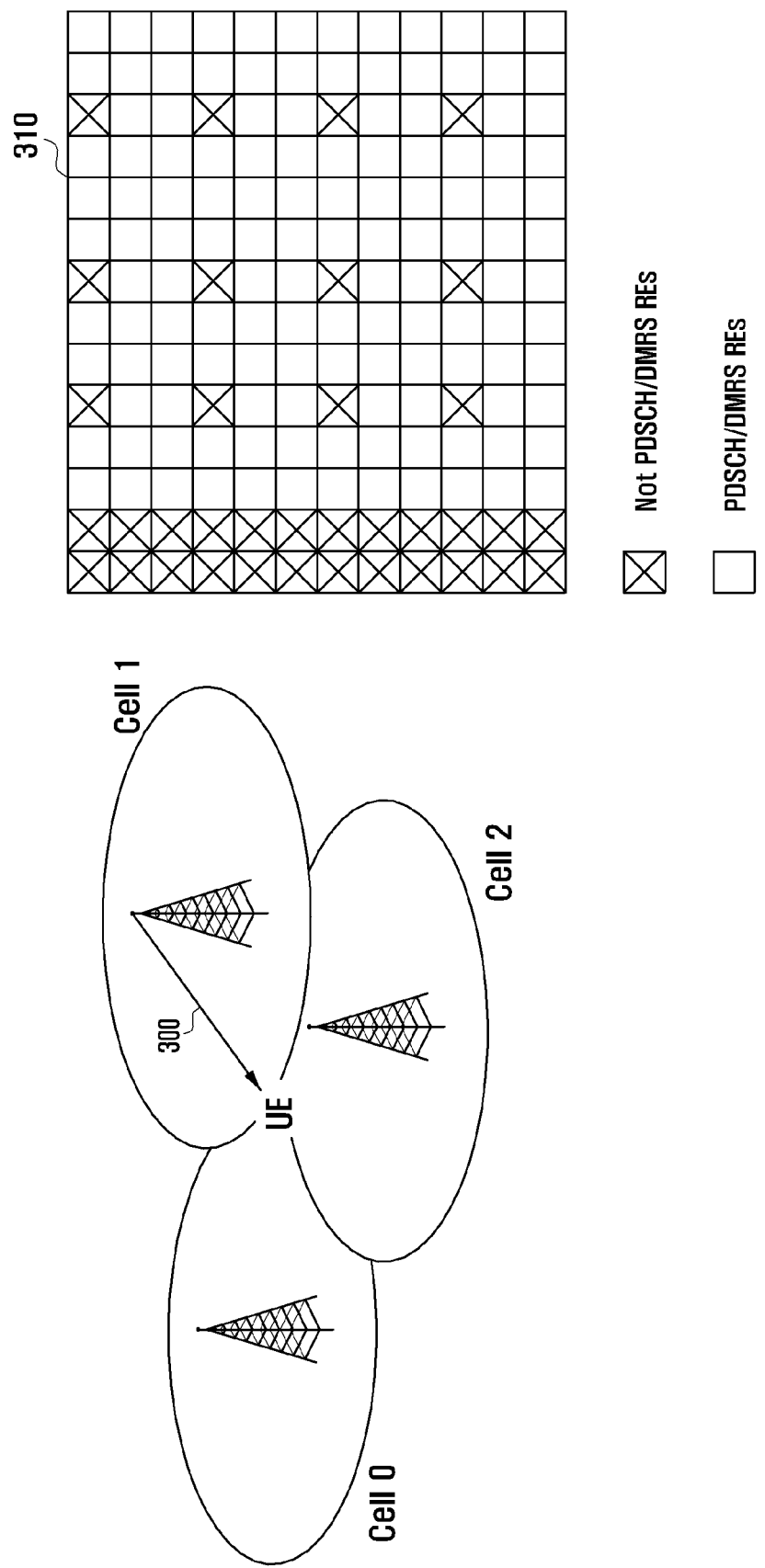

FIG. 3 is a diagram illustrating a configuration of the communication system with a CoMP set, according to an embodiment of the present invention. In this embodiment of the present invention, the CoMP set is {cell 0, cell 1, and cell 2}.

Referring to FIG. 3, the UE receives a signal 300 from cell 1. In the embodiment of FIG. 3, the UE receives the PDSCH signal from one cell as in the non-CoMP transmission of FIG. 1. A right-most portion of FIG. 3 shows a radio resource configuration 310 for transmitting the PDSCH in cell 1. Unlike the non-CoMP transmission mode in FIG. 1, the UE, which is in the state of receiving the PDSCH from one of cells 0, 1, and 2, may switch to one of the other cells to continue receiving the PDSCH without handover. Typically, in order for the UE receiving the PDSCH from a cell to continue PDSCH reception from another cell in the system that does not support CoMP, it is inevitable to perform a handover process along with higher layer signaling. The handover process causes delay, resulting in an increase of failure probability. In the method according to the embodiment of FIG. 3, however, the UE may switch among cells 0, 1, and 2 for receiving the same signal without a handover process with higher layer signaling. This ability is due to a centralized controller that controls the transmissions of multiple cells participated in the CoMP transmission.

In order for the UE to switch between two cells in a state of receiving signals without higher layer signaling, the UE has to check the information on the cells that are transmitting the PDSCH. Assuming that the cells are operating with different radio resource configurations 130, 140, and 150, as shown in FIG. 1, the UE cannot decode the PDSCH correctly without the information on the radio resource configurations. There is therefore a need for a separate control channel for indicating the radio resource carrying the PDSCH whenever the eNB transmits the PDSCH to the UE. Since the higher layer signaling-based cell assignment is ruled out in the embodiment of FIG. 3, it is necessary to notify of the radio resource configuration using the control channel, such as a Physical Downlink Control Channel (PDCCH) defined in LTE-A other than higher layer signaling.

Figure 4:
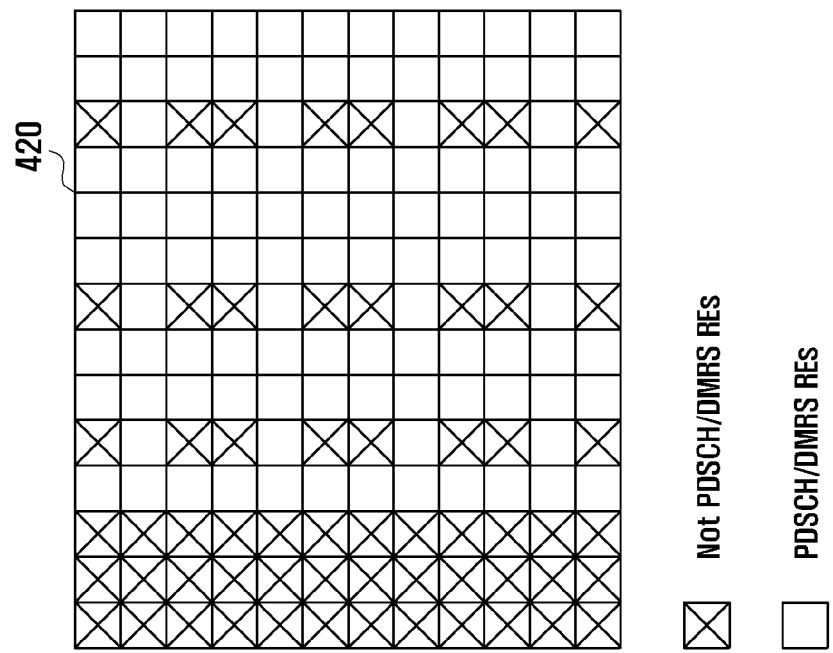
Figure 4:
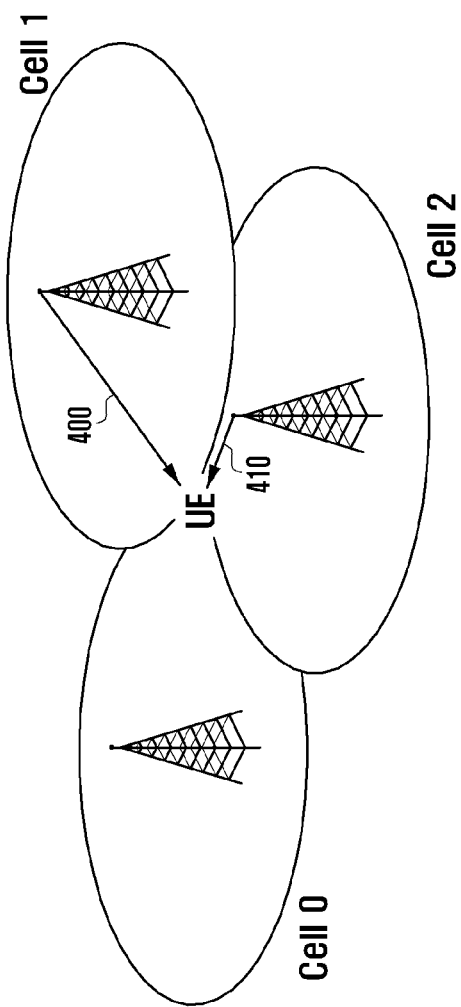

FIG. 4 is a diagram illustrating a configuration of the communication system with a CoMP set, according to another embodiment of the present invention. In this embodiment of the present invention, the CoMP set is {cell 0, cell 1, and cell 2}.

In FIG. 4, the UE receives a PDSCH signal 400 and 410 from two different cells. A right-most portion of FIG. 4 shows a radio resource configuration 420 for receiving the PDSCH from the cells 1 and 2. Like the embodiment of FIG. 3, the UE may switch between the cells for receiving data seamlessly under the scheduling of a centralized controller, instead of being connected in a fixed manner to one cell. Specifically, the PDSCH 400 and 410 may be transmitted from the cells 1 and 2 for a certain duration and then from the cells 2 and 3 for next duration under the control of the centralized controller, in the embodiment of FIG. 4. The transmission cell switching can be performed without handover process with a separate higher layer signaling, as in the embodiment of FIG. 3. According to the embodiment of FIG. 4, the radio resource configuration for transmitting the PDSCH may change depending on which cells transmit data to the UE, as in the embodiment of FIG. 3. As aforementioned, the transmitter has to notify the UE of the radio resource for use in PDSCH transmission through a control channel, such as the PDCCH.

Figure 5:
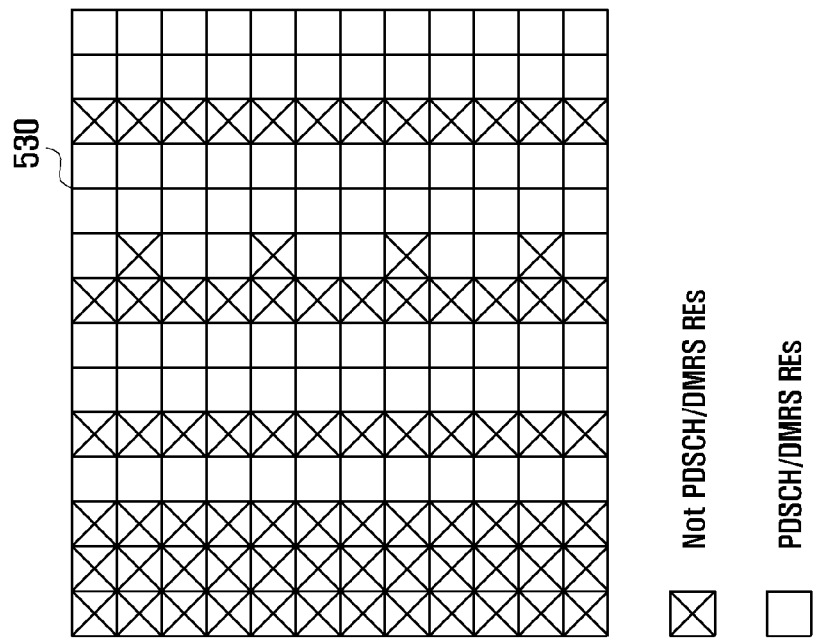
Figure 5:
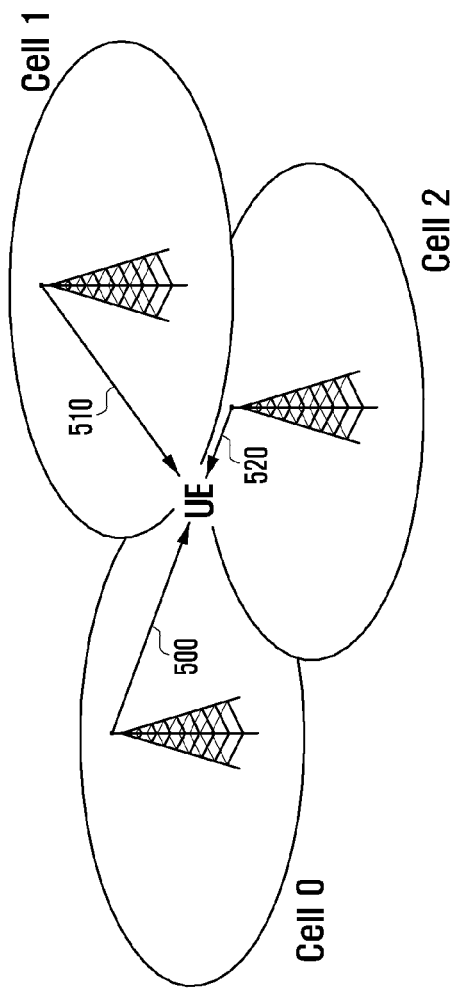

FIG. 5 is a diagram illustrating a configuration of the communication with a CoMP set, according to still another embodiment of the present invention.

According to the embodiment of FIG. 5, the UE receives signals 500, 510 and 520 from cells 0, 1, and 2. The UE receives the PDSCH signal from all of the cells in the CoMP set. A right-most portion of FIG. 5 shows the radio resource configurations for receiving the PDSCH from the cells 0, 1, and 2.

In the embodiments of FIGS. 3, 4, and 5, a centralized controller determines the cell(s) for transmitting data to the terminal. When the centralized controller determines to transmit data to the UE through one cell, the PDSCH is transmitted as shown in the embodiment of FIG. 3. When the centralized controller determines to transmit data to all of the UEs of the CoMP sets, the PDSCH is transmitted as shown in the embodiment of FIG. 5. According to the decision made by the centralized controller, the cells for transmitting PDSCH to the UE and a number of cells for the PDSCH transmission are determined. Embodiments of the present invention provide a method for notifying the UE of the radio resource for transmitting the PDSCH in CoMP transmission with various combinations of cells as shown in the embodiments of FIGS. 3, 4, and 5.

In order to accurately check the radio resource used for PDSCH transmission, the CRS transmission resource and the size of the control region should be determined. The CRS transmission resource may be CRS overhead.

The procedure for determining the CRS transmission resource is performed as follows. First, the centralized controller configures a CoMP set for the UE. The centralized controller determines the CoMP set for the UE in consideration of the location of the UE, available eNBs, and a radio system traffic status. Once the CoMP set is determined, the centralized controller notifies the UE of the following information to indicate the radio resources available for PDSCH transmission in the respective cells.

First information: CRS-related information: number of CRS antenna ports and CRS frequency domain offset Second information: Multi-Media Broadcast over a Single Frequency Network (MBSFN) subframe-related information: information on which subframe is the MBSFN subframe Third information: subframe synchronization-related information The first information is necessary for accurately determining the location of the CRSs transmitted from the respective cells. The CRS of each cell is determined by a number of CRS antenna ports and the offset value configured for the CRS in the frequency domain.

The second information is necessary for determining the subframe carrying CRS. In the case of an LTE-A system, the transmission is performed in units of 1 millisecond, which is referred to as subframe. In the LTE-A system, the MBSFN subframe is configured as a special subframe such that the CRS is not transmitted on the resource from the third OFDM symbol. Each cell can be configured to transmit the MBSFN subframe periodically, and the second information corresponds to the information thereon.

The third information is information on whether the subframes transmitted by respective cells are synchronized in the time domain. Typically, it is possible to set the time offset values in units of subframes by cell. In order to accurately determine the radio resource of a specific subframe, it is necessary to know when the MBSFN subframes occur in the respective cells, and the third information is used to determine the MBSFN subframe occasions.

After the first, second, and third information are provided to the UE through higher layer signaling, the information on the cells participating in the CoMP transmission and the number of cells participating in the CoMP transmission are provided to the UE such that the UE is capable of determining the radio resource used for PDSCH transmission.

In the following tables, the index may be used as an indicator for indicating the CRS transmission resource or an identifier for identifying the CRS transmission resource. The index also may be used as an indicator for indicating the information on the cell participated in the data transmission or the identifier for identifying the information on the data transmission.

Table 1 shows details on the indices available for notifying the UE of the CRS transmission resource when two cells are included in the CoMP set.

TABLE 1

| Index | Cell A | Cell B | CRS Transmission Resource |
|---|---|---|---|
| 0 | TX | No TX | Cell A |
| 1 | No TX | TX | Cell B |
| 2 | TX | TX | Cell A + Cell B |

Table 1 can be applied to the case where the CoMP set includes up to 2 cells. Since the CoMP set includes at most two cells, it is necessary to consider only two cases, i.e., when the PDSCH is transmitted by one of two cells and both the two cells. Although Table 1 explicitly shows whether each cell transmits PDSCH, this information may not be needed by the UE. Specifically, it is possible for the UE to receive PDSCH and correctly decode data thereon only with the information on the time and frequency resources used for PDSCH transmission. For this reason, it is possible to accomplish the object of the present invention only by notifying the UE of the CRS transmission information, without providing information on whether each cell transmits PDSCH or data, using Table 2 rather than Table 1.

TABLE 2

| Index | CRS Transmission Resource |
|---|---|
| 0 | Cell A |
| 1 | Cell B |
| 2 | Cell A + Cell B |

Tables 1 and 2 may be used for notifying the UE of the CRS transmission resource only when the CoMP set includes two cells. Typically, a number of cells included in the CoMP set is likely to be greater than 2. Table 3 shows details on the indices available for notifying the UE of the transmission resources when the maximum number of cells includable in the CoMP set is 3. Table 3 may be used to notify of the CRS transmission resource even in case of the CoMP set including two cells by disabling some indices.

TABLE 3

| Index | Cell A | Cell B | Cell C | CRS Transmission Resource |
|---|---|---|---|---|
| 0 | TX | No TX | No TX | Cell A |
| 1 | No TX | TX | No TX | Cell B |
| 2 | No TX | No TX | TX | Cell C |
| 3 | TX | TX | No TX | Cell A + Cell B |
| 4 | TX | No TX | TX | Cell A + Cell C |
| 5 | No TX | TX | TX | Cell B + Cell C |
| 6 | TX | TX | TX | Cell A + Cell B + Cell C |

Table 3 is designed by taking notice of the transmissions in one, two, or all of the three cells. In Table 3, the indices 0, 1, and 2 are designated for use in single cell transmission. The indices 3, 4, 5, and 6 are designated for used in joint transmission of multiple cells. The indices 3, 4, and 5 among the joint transmission indices are designated for the joint transmission in which two cells are participating among the total three cells. Typically, when the number of cells participating in the joint transmission is less than the number of cells included in the CoMP set, it is preferred that one of the cells participating in the joint transmission is the serving cell. The serving cell is the cell to which the UE has connected through a handover process in the mobile communication system composed of a plurality of cells. Meanwhile, the other cells in the CoMP set, with the exception of the serving cell, are determined through a CoMP-related process regardless of the handover process.

As described above, if the number of the cells participating in the joint transmission is less than the number of cells belonging to the CoMP set, it is useful for one of the participants to be the serving cell. Table 4 shows details on the indices designed by taking notice that one of the cells participated in the joint transmission is the serving cell, especially when the number of the participants of the joint transmission is less than the cells belonged to the CoMP set.

TABLE 4

| Index | Cell A (serving cell) | Cell B | Cell C | CRS Transmission Resource |
|---|---|---|---|---|
| 0 | TX | No TX | No TX | Cell A |
| 1 | No TX | TX | No TX | Cell B |
| 2 | No TX | No TX | TX | Cell C |
| 3 | TX | TX | No TX | Cell A + Cell B |
| 4 | TX | No TX | TX | Cell A + Cell C |
| 5 | TX | TX | TX | Cell A + Cell B + Cell C |

In Table 4, it is assumed that cell A is the serving cell. Although the description is made under the assumption that the cell is the serving cell, the present invention can be applied to the case where one of other cells is the serving cell if it has been negotiated between the eNB and the UE. In Table 4, the indices 3 and 4 are designated for a joint transmission in which two cells participate. Referring to indices 3 and 4, it shows that the cells participating in the joint transmission include cell A as the serving cell. The CRS transmission resource notification, using table 4, is advantageous to reduce the information amount necessary for CRS transmission resource notification by negating the notification of the joint transmissions unavailable in a real situation. For example, as compared to Table 3 in which 7 types of CRS transmission resource allocations exist, it is possible for the centralized controller to provide the 6 types of CRS transmission resource allocations using Table 4.

By modifying Table 3, it is possible to notify the UE of the CRS transmission resource, without explicit indication on the cells transmitting data to the UE, as in Table 1. For this reason, Table 3 may be replaced by Table 5 to notify the UE of the CRS transmission resource, without explicit indication on whether each cell transmits data to the UE.

Table 5 shows details on the indices available for CRS transmission resource notification without explicit indication on whether each cell transmits data to the UE with the CoMP set including up to three cells.

TABLE 5

| Index | CRS Transmission Resource |
|---|---|
| 0 | Cell A |
| 1 | Cell B |
| 2 | Cell C |
| 3 | Cell A + Cell B |
| 4 | Cell A + Cell C |
| 5 | Cell B + Cell C |
| 6 | Cell A + Cell B + Cell C |

By modifying Table 4, it is possible to notify the UE of the CRS transmission resource without explicit information on whether each cell transmits data to the UE, so as to take the effect of the method using Table 5 like the case of using Table 3.

In the method using Table 1, 2, 3, 4, or 5, the centralized controller notifies the UE of only the CRS transmission resource in order for the UE to be aware of the radio resource for receiving PDSCH thereon. In order to receive PDSCH in CoMP-enabled system, the UE needs the scrambling-related information in addition to the CRS transmission resource-related information.

In the case of a non-CoMP system, since the PDSCH is received from one cell, the UE scrambles a Demodulation Reference Signal (DMRs) used for estimating the PDSCH or a channel of the PDSCH with the cell ID assigned to the corresponding cell. Typically, the scrambling sequence is generated using an initial state, and the scrambling sequence of the PDSCH and the DMRS takes the initial state value as the function of the cell ID of the connected cell.

In the case of a CoMP system, it is possible for multiple cells to take part in the joint transmission in which the participants transmit data to one UE simultaneously. In the joint transmission, the eNB has to determine a cell having a cell ID to be used for generating the PDSCH or DMRS scrambling sequence, and notify the UE of the determination result.

In order to notify the UE of the cell ID used for generating the scrambling code, it is possible to perform joint coding on the CRS transmission resource-related information with the cell ID and transmit the coding result on the control channel, such as the PDCCH. Since the CRS transmission resource information and the scrambling-related information are correlated, it is advantageous to joint-encode the two different pieces of information in view of the information amount to be transmitted on the control channel. Table 6 shows details on the indices for notifying the UE of the scrambling and CRS transmission resource-related information when the CoMP set includes two cells.

TABLE 6

| Index | Cell A | Cell B | Scrambling | CRS Transmission Resource |
|---|---|---|---|---|
| 0 | ON | OFF | Cell A | Cell A |
| 1 | OFF | ON | Cell B | Cell B |
| 2 | ON | ON | Cell A | Cell A + Cell B |
| 3 | ON | ON | Cell B | Cell A + Cell B |

In an embodiment of the present invention, the scrambling based on Table 6 is performed according to the following rules.

(i) When one cell transmits data to the UE, the scrambling is performed with the cell ID of the corresponding cell.

(ii) When multiple cells transmit data to the UE, the scrambling is performed with the cell ID of one of the multiple cells.

In the case of single-cell transmission, the reason why the scrambling is always performed with the cell ID of the corresponding cell is because the Multi-User Multiple Input Multiple Output (MU-MIMO) using the cell ID of the corresponding cells for transmission to multiple UEs shows adequate throughput. In the case of joint transmission, it may give advantages to use the cell ID of a specific cell depending on the eNB scheduler. The cell having the cell ID to be used for scrambling is determined by the eNB at scheduling in every subframe.

By modifying Table 6, it is possible to notify the UE of the CRS resource and scrambling information without explicit indication on the cell(s) transmitting data to the UE, as in the case of using Table 1. For the same reason, Table 6 may be replaced by Table 7 in order to notify the UE of the CRS transmission resource information and scrambling information, without an explicit indication on the cell(s) transmitting data to the UE. Table 7 shows details on the indices for use in notifying the UE of the CRS transmission resource, and scrambling information without explicit indication about the cell(s) transmitting data to the UE when the CoMP set includes two cells.

TABLE 7

| Index | Scrambling | CRS Transmission Resource |
|---|---|---|
| 0 | Cell A | Cell A |
| 1 | Cell B | Cell B |
| 2 | Cell A | Cell A + Cell B |
| 3 | Cell B | Cell A + Cell B |

Table 8 shows details on the indices for use in notifying the UE of the scrambling information and CRS transmission resource information when the CoMP set includes three cells.

TABLE 8

| Index | Cell A | Cell B | Cell B | Scrambling | CRS Transmission Resource |
|---|---|---|---|---|---|
| 0 | ON | OFF | OFF | Cell A | Cell A |
| 1 | OFF | ON | OFF | Cell B | Cell B |
| 2 | OFF | OFF | ON | Cell C | Cell C |
| 3 | ON | ON | OFF | Cell A | Cell A + Cell B |
| 4 | ON | ON | OFF | Cell B | Cell A + Cell B |
| 5 | ON | OFF | ON | Cell A | Cell A + Cell C |
| 6 | ON | OFF | ON | Cell C | Cell A + Cell C |
| 7 | OFF | ON | ON | Cell B | Cell B + Cell C |
| 8 | OFF | ON | ON | Cell C | Cell B + Cell C |
| 9 | ON | ON | ON | Cell A | Cell A + Cell B + Cell C |
| 10 | ON | ON | ON | Cell B | Cell A + Cell B + Cell C |
| 11 | ON | ON | ON | Cell C | Cell A + Cell B + Cell C |

As described above, when the number of cells participating in the joint transmission is less than the number of cells included in the CoMP set, it is advantageous that one of the cells participating in the joint transmission is the serving cell. Table 9 shows details on the indices designed by taking notice that one of the cells participating in the joint transmission is the serving cell, especially when the number of the participants of the joint transmission is less than the cells belonging to the CoMP set.

TABLE 9

| Index | Cell A (serving cell) | Cell B | Cell B | Scrambling | CRS Transmission Resource |
|---|---|---|---|---|---|
| 0 | ON | OFF | OFF | Cell A | Cell A |
| 1 | OFF | ON | OFF | Cell B | Cell B |
| 2 | OFF | OFF | ON | Cell C | Cell C |
| 3 | ON | ON | OFF | Cell A | Cell A + Cell B |
| 4 | ON | ON | OFF | Cell B | Cell A + Cell B |
| 5 | ON | OFF | ON | Cell A | Cell A + Cell C |
| 6 | ON | OFF | ON | Cell C | Cell A + Cell C |
| 7 | ON | ON | ON | Cell A | Cell A + Cell B + Cell C |
| 8 | ON | ON | ON | Cell B | Cell A + Cell B + Cell C |
| 9 | ON | ON | ON | Cell C | Cell A + Cell B + Cell C |

By modifying Table 9, it is possible to notify the UE of only the CRS transmission resource information and scrambling information, without explicit information on the cell(s) transmitting data to the UE, as in the case of using Table 1. Table 10 shows details on the indices for use in notifying the UE of the CRS transmission resource information and scrambling information, without explicit indication about the cell(s) transmitting data to the UE.

TABLE 10

| Index | Scrambling | CRS Transmission Resource |
|---|---|---|
| 0 | Cell A | Cell A |
| 1 | Cell B | Cell B |
| 2 | Cell C | Cell C |
| 3 | Cell A | Cell A + Cell B |
| 4 | Cell B | Cell A + Cell B |
| 5 | Cell A | Cell A + Cell C |
| 6 | Cell C | Cell A + Cell C |
| 7 | Cell A | Cell A + Cell B + Cell C |
| 8 | Cell B | Cell A + Cell B + Cell C |
| 9 | Cell C | Cell A + Cell B + Cell C |

Tables 1 to 10 show indices, which the eNB uses to notify the UE of the CRS transmission resource information and scrambling information through control channel, such as the PDCCH in the CoMP system. The UE is capable of accurately determining the radio resource used for PDSCH transmission with the information on the size of the control region in addition to the CRS transmission resource. Embodiments of the present invention provide three methods for determining the size of the control region.

A first control region size determination method uses a fixed size of the control region. Specifically, the system notifies the UE of a fixed number of OFDM symbols as the control region through higher layer signaling. Assuming that the higher layer system sets the control region to a fixed number of 3, the UE regards the three OFDM symbols at the beginning of the subframe as the control region, and the rest of the OFDM symbols following the three OFDM symbols as the data region.

A second control region size determination method determines the size of the control region using PCFICHs transmitted by multiple cells. Each cell participating in the joint transmission to the UE sends the UE information on the size of the control region for the corresponding cell in PCFICH. The UE receives PCFICHs transmitted by the respective cells and determines that the data region starts after the end of the control region having the greatest size among the cells participating in the joint transmission. For example, if cells A and B send PCFICHs having control region sizes set to 2 and 3, respectively, the UE determines that the data region starts after three OFDM symbols at the beginning of the subframe, according to the size of the control region of cell B, which is greater than the size of cell A. This information may be provided to the UE in the form of a combination of the CRS transmission resource information and scrambling information, as described with reference to FIGS. 1 to 10. Table 11 shows details on the indices indicating combinations of the three information, according to an embodiment of the present invention.

TABLE 11

| Index | Cell A | Cell B | Cell B | Scrambling | CRS 전송자원 | Data Region |
|---|---|---|---|---|---|---|
| 0 | ON | OFF | OFF | Cell A | Cell A | after $S_A$ |
| 1 | OFF | ON | OFF | Cell B | Cell B | after $S_B$ |
| 2 | OFF | OFF | ON | Cell C | Cell C | after $S_C$ |
| 3 | ON | ON | OFF | Cell A | Cell A + Cell B | after $\max(S_A, S_B)$ |
| 4 | ON | ON | OFF | Cell B | Cell A + Cell B | after $\max(S_A, S_B)$ |
| 5 | ON | OFF | ON | Cell A | Cell A + Cell C | after $\max(S_A, S_C)$ |
| 6 | ON | OFF | ON | Cell C | Cell A + Cell C | after $\max(S_A, S_C)$ |
| 7 | OFF | ON | ON | Cell B | Cell B + Cell C | after $\max(S_B, S_C)$ |
| 8 | OFF | ON | ON | Cell C | Cell B + Cell C | after $\max(S_B, S_C)$ |
| 9 | ON | ON | ON | Cell A | Cell A + Cell B + Cell C | after $\max(S_A, S_B, S_C)$ |
| 10 | ON | ON | ON | Cell B | Cell A + Cell B + Cell C | after $\max(S_A, S_B, S_C)$ |
| 11 | ON | ON | ON | Cell C | Cell A + Cell B + Cell C | after $\max(S_A, S_B, S_C)$ |

In Table 11, $S_i$ denotes the control region size of the $i^{th}$ cell. In case of the LTE/LTE-A system, $S_i$ is set to 1, 2, or 3, and the UE checks this value in the PCFICH transmitted from the $i^{th}$ cell. If the PDSCH is received from a single cell as indicated by one of the indices 0, 1, and 2, as shown in Table 11, the UE determines the data region by taking only the control region size of the corresponding cell into consideration. For example, if $S_A$, i.e., the control region size of cell A, is 3, the UE regards the three OFDM symbols at the beginning of the subframe as the control region, and the rest OFDM symbols following the third OFDM symbol as the data region. Otherwise, if the index is 7 and if the $S_B$ and $S_c$ are set 2 and 1, respectively, the UE determines that the data region starts from the third OFDM symbol in the subframe.

The reason why the data region is determined based on the largest one of the control region sizes of respective cells participated in the joint transmission is because the PDSCHs are transmitted using the same resource in the respective cells. The data transmission in which a part of the PDSCH is transmitted by the cell A and the remaining part of the PDSCH is transmitted by the cells B and C, jointly, causes degradation of reception performance.

In Tables 1 to 11, the index indicates the CRS transmission information, a combination of CRS transmission resource information and scrambling information, or a combination of CRS transmission resource information, scrambling information and control region size information. According to an embodiment of the present invention, however, the index indicating only the scrambling-related information or the control region size information may be used. Also, it is possible to use the index indicating a combination of the CRS transmission resource information and the control region size, or a combination of the scrambling-related information and the control region size information. Specifically, the index may be used to indicate at least one of the CRS transmission resource information, scrambling-related information, and control region size information.

Figure 6:
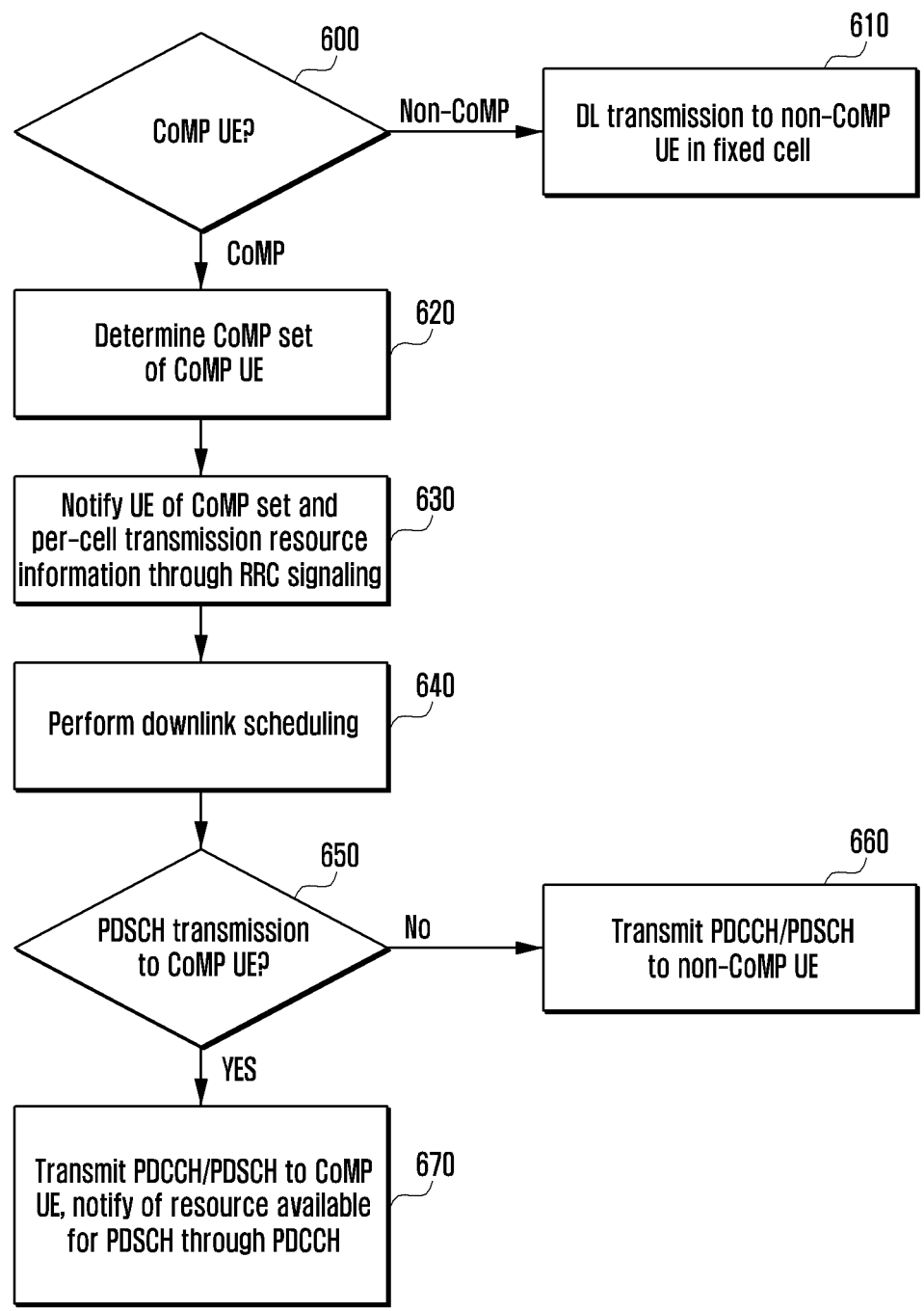
FIG. 6 is a flowchart illustrating a method for a centralized controller to notify a UE of PDSCH radio resource information and scrambling information, according to an embodiment of the present invention.

FIG. 6 is a flowchart illustrating a method for a centralized controller to notify the UE of the PDSCH radio resource and scrambling information, according to an embodiment of the present invention. The centralized controller is named to integrally control the connections to multiple cells, and may be referred to as a communication connection apparatus.

The centralized controller determines whether the UE is a CoMP UE, in step 600. Typically, CoMP and non-CoMP UEs coexist in the CoMP system. The CoMP UEs are located at a cross section of multiple cells so as to receive the signals transmitted by the multiple cells at similar received signal strength. If it is determined that the UE is a non-CoMP UE, the eNB transmits the PDSCH to the UE in a fixed cell, in step 610.

If it is determined that the UE is a CoMP UE, the eNB determines a CoMP set for the CoMP UE, in step 620. The CoMP set is provided to the UE, in step 630. The information sent in step 630 of FIG. 6 may include at least one of the first, second, and third information for determining a CRS transmission resource related to the cells included in the CoMP set, a cell ID of at least one of the cells included in the CoMP set, a part of the first information, a part of the second information, and a part of the third information. In step 630, the indices (indicator) of Tables 1 to 11 and the cell information corresponding to the indices may be transmitted to the UE. Specifically, the index informs the UE of the CRS transmission resource or CRS transmission resource and scrambling.

After transmitting such information to the UE, the centralized controller performs downlink scheduling, in step 640. Specifically, the centralized controller determines the time duration in units of subframes, and the frequency in units of Resource Blocks (RBs) to be allocated to the UE.

The centralized controller determines whether to transmit the PDSCH to the CoMP UE, in step 650. When transmitting the PDSCH to the non-CoMP UE according to the downlink scheduling decision, the centralized controller transmits PDCCH and PDSCH according to the conventional method, in step 660. When transmitting the PDSCH to the CoMP UE, the centralized controller notifies the UE of the radio resource and scrambling code used for transmitting PDSCH through the control channel such as the PDCCH and the PCFICH, in step 670. The indices described with reference to Tables 1 to 11 can be used to provide this information.

Figure 7:
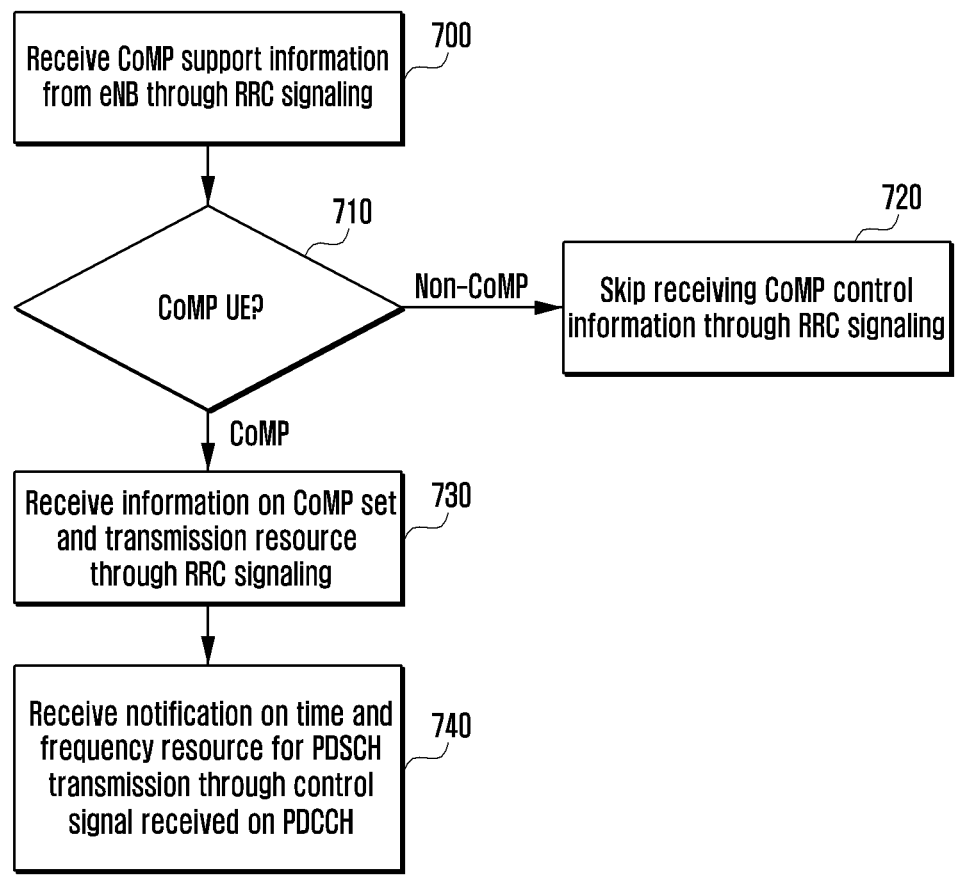
FIG. 7 is a flowchart illustrating a method for the UE to receive the PDSCH radio resource information and scrambling information, according to an embodiment of the present invention.

FIG. 7 is a flowchart illustrating a method for the UE to receive the PDSCH radio resource information and scrambling information, according to an embodiment of the present invention.

The UE receives the information on whether it is a CoMP UE from the eNB through RRC signaling, in step 700. The UE determines whether it is the CoMP UE, in step 710. If it is determined that the UE is a non-CoMP UE, the UE skips receiving the CoMP-related control information through RRC signaling, in step 720.

If it is determined that the UE is a CoMP UE, the UE receives at least one of the first information, the second information, and the third information for determining a CRS transmission resource related to the cells included in the CoMP set, a cell ID of at least one of the cells included in the CoMP set, a part of the first information, a part of the second information, and a part of the third information, through RRC signaling, in step 730. The UE receives the radio resource information and scrambling information on the control channel, such as the PDCCH and the PCFICH, to determine the radio resource and scrambling code with which the PDSCH is transmitted, in step 740.

Figure 8:
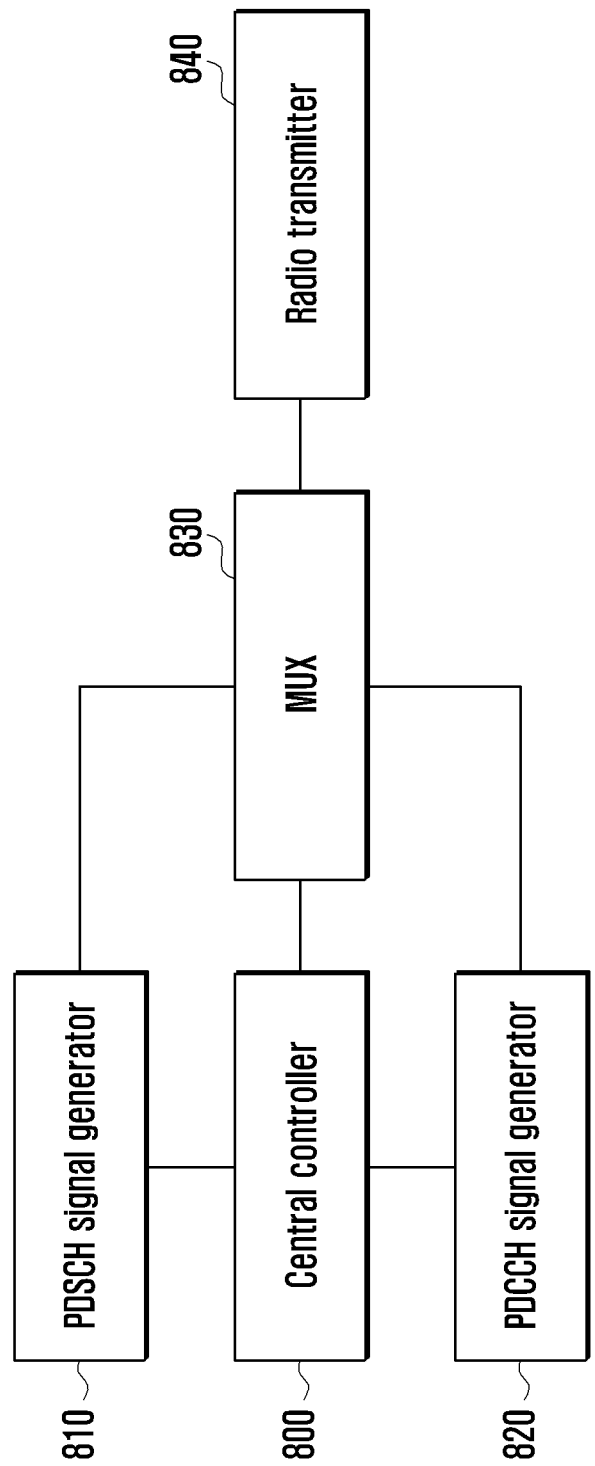
FIG. 8 is a block diagram illustrating a configuration of an eNB transmitter for transmitting CoMP radio resource information and scrambling information to the UE, according to an embodiment of the present invention.

FIG. 8 is a block diagram illustrating a configuration of an eNB transmitter for transmitting CoMP radio resource information and scrambling information to the UE, according to an embodiment of the present invention.

In FIG. 8, a central controller 800 checks the CRS transmission resource in a certain subframe and RB, a control region size, and a scrambling code. Based on this information, a PDCCH signal generator 820 determines the information to be transmitted on the PDCCH and the PCFICH. A multiplexer 830 multiplexes the PDCCH and PCFICH signals generated by the PDCCH signal generator 820 with the PDSCH signal generated by a PDSCH signal generator 810, so as to be transmitted by means of a radio transmitter 840 in the form of a radio signal.

Figure 9:
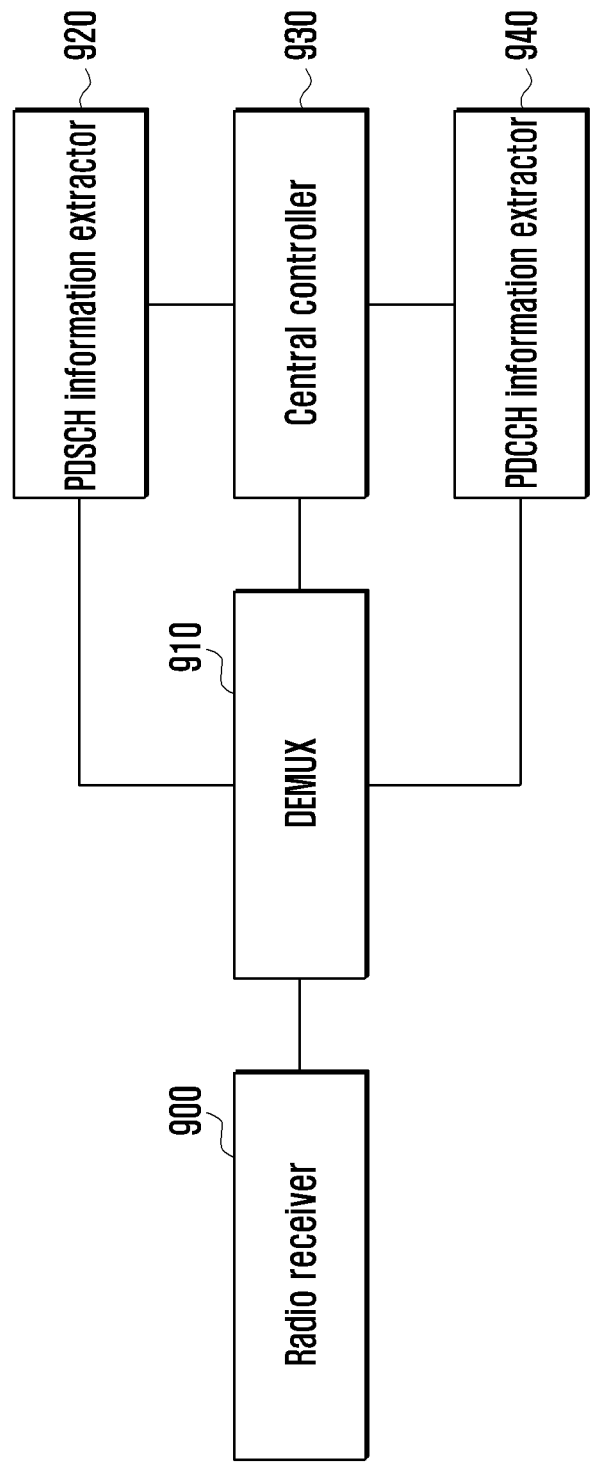
FIG. 9 is a block diagram illustrating a configuration of a UE receiver for receiving CoMP radio resource information and scrambling information, according to an embodiment of the present invention.

FIG. 9 is a block diagram illustrating a configuration of a UE receiver for receiving CoMP radio resource information and scrambling information, according to an embodiment of the present invention.

A radio receiver 900 receives a radio signal transmitted by the eNB. The received signal is demultiplexed by a demultiplexer 910. The demultiplexer 910 delivers the demultiplexed PDCCH and PCFICH to a PDCCH information extractor 940, and the PDCCH information extractor 940 recovers the information carried on PDCCH and PCFICH. The recovered information is delivered to a central controller 930. The central controller 930 checks the radio resource and scrambling code used for transmitting the PDSCH based on the information acquired from PDCCH and PCFICH. This information is used by a PDSCH information extractor 920 to recover traffic data carried on the PDSCH.

As described above, methods and apparatus for scheduling CoMP UEs according to the present invention are capable of efficiently scheduling UEs in the CoMP-based communication system.

It will be understood that each block of flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing a specific logic function(s). Moreover, it should be noted that the functions of the blocks may be performed in different order in several modifications. For example, two successive blocks may be performed substantially at the same time, or may be performed in reverse order according to their functions.

The term "module", according to embodiments of the present invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and may be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The UE, according to an embodiment of the present invention, can be any type of portable electronic device, including for example, a mobile phone, Personal Digital Assistant (PDA), digital broadcast receiver, and Portable Multimedia Player (PMP).

Methods according to embodiments of the present invention can be applied to the mobile terminals manufactured in any of a bar type, flip type, sliding type, rotation type, and any combination thereof.

Although the description is directed to a UE equipped with an internal antenna of an F type, the internal antenna can be any type of Microstrip patch antennas including Microstrip Slot Antenna, Microstrip Ring Antenna, Microstrip Aperture Array Antenna, and Microstrip Stripline Antenna; micro antennas including Inverted F Antenna, Surface-mounted device (SMD) antenna, and Monolithic Microwave Integrated Circuits (MMIC) antenna; and other modified types of antenna.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A scheduling method of a communication system, the scheduling method comprising the steps of:
determining, at a centralized controller, a Coordinated Multi-point Transmission/Reception (CoMP) set including at least two cell among a plurality of cells, each cell included in the CoMP set being capable of transmitting data to a terminal that supports a CoMP function;
determining, at the centralized controller, transmitting time of the cells in the CoMP set;
transmitting, at the centralized controller, scheduling information including an indicator for indicating which of the cells in the CoMP set are to transmit the data, and notifying a terminal of the COMP set comprising combination information of an availability of a serving cell and a Common Reference Signal (CRS) transmission resource indicating joint transmission is available, wherein the combination information in the CoMP set negates a notification of unavailable joint transmissions, which is sent when the serving cell is not available; and
transmitting, at the cells in the COMP set, the scheduling information to the terminal.

2. The scheduling method of claim 1, wherein the combination information indicated by the indicator further indicates scrambling information.

3. The scheduling method of claim 1, wherein the combination information indicated by the indicator further indicates control region size information.

4. A method for scheduling a terminal supporting a Coordinated Multi-point Transmission/Reception (CoMP) function, the method comprising the steps of:
receiving, at the terminal, scheduling information from cells included in a CoMP set, wherein the scheduling information is determined by a centralized controller and includes an indicator indicating which of the cells in the CoMP set are to transmit data and receiving times of each of the cells in the CoMP set; and
receiving the data from at least two cells using the scheduling information,
wherein the indicator further notifies the terminal of the CoMP set comprising combination information of an availability of a serving cell and a Common Reference Signal (CRS) transmission resource indicating joint transmission is available, and wherein the combination information in the CoMP set negates a notification of unavailable joint transmissions which is received when the serving cell is not available.

5. The method of claim 4, wherein the combination information indicated by the indicator further indicates scrambling information.

6. The method of claim 4, wherein the combination information indicated by the indicator further indicates control region size information.

7. A terminal supporting a Coordinated Multi-point Transmission/Reception (CoMP) function, the terminal comprising:

a communication unit that receives scheduling information from cells included in a CoMP set, wherein the scheduling information is determined by a centralized controller and includes an indicator indicating which of the cells in the CoMP set are to transmit data and receiving times of each of the cells in the CoMP set; and a controller unit that controls the communication unit to receive the data using the scheduling information, wherein the indicator further notifies the terminal of the COMP set comprising combination information of an availability of a serving cell and a Common Reference Signal (CRS) transmission resource indicating joint transmission is available, and wherein the combination information in the COMP set negates a notification of unavailable joint transmissions, which is received when the serving cell is not available.

8. The terminal of claim 7, wherein the combination information indicated by the indicator further indicates control region size information.

9. The terminal of claim 7, wherein the combination information indicated by the indicator further indicates scrambling information.

* * * * *